United States Patent
Leng

(10) Patent No.: US 9,213,131 B2
(45) Date of Patent: Dec. 15, 2015

(54) BACK-PLATE STRUCTURE OF BACKLIGHT, BACKLIGHT AND DISPLAY DEVICE

(71) Applicant: BOE TECHNOLOGY GROUP CO., LTD., Beijing (CN)

(72) Inventor: Changlin Leng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 171 days.

(21) Appl. No.: 13/960,952

(22) Filed: Aug. 7, 2013

(65) Prior Publication Data

US 2014/0085929 A1    Mar. 27, 2014

(30) Foreign Application Priority Data

Sep. 25, 2012 (CN) .......................... 2012 1 0362284

(51) Int. Cl.
*H01L 33/00* (2010.01)
*F21V 8/00* (2006.01)

(52) U.S. Cl.
CPC .............. *G02B 6/0005* (2013.01); *G02B 6/001* (2013.01)

(58) Field of Classification Search
CPC ......... G02B 6/001; G02B 6/0005; G02B 6/04
USPC ............... 362/97.1, 97.2, 97.3, 561, 554, 555
See application file for complete search history.

(56) References Cited

U.S. PATENT DOCUMENTS

| 5,442,467 | A  | * | 8/1995  | Silverstein et al. ........... 349/159 |
| 6,195,016 | B1 | * | 2/2001  | Shankle et al. .......... 340/815.42 |
| 7,540,644 | B1 | * | 6/2009  | Allen ............................. 362/554 |
| 2002/0067444 | A1 |   | 6/2002 | Paolini et al. |
| 2008/0112677 | A1 | * | 5/2008 | Smith .......................... 385/119 |
| 2010/0309391 | A1 | * | 12/2010 | Plut .............................. 348/756 |

FOREIGN PATENT DOCUMENTS

| CN | 1627150 A    | 6/2005 |
| CN | 102253530 A  | 11/2011 |
| WO | 2005071471 A1 | 8/2005 |

OTHER PUBLICATIONS

Third Chinese Office Action dated Jul. 30, 2014; Appln. No. 201210362284.X.
Fourth Chinese Office Action dated Dec. 31, 2014; Appln. No. 201210362284.X.
First Chinese Office Action dated Jun. 27, 2013; Appln. No. 201210362284.X.
Second Chinese Office Action dated Feb. 21, 2014; Appln. No. 201210362284.X.

* cited by examiner

*Primary Examiner* — Ali Alavi
(74) *Attorney, Agent, or Firm* — Ladas & Parry LLP

(57) ABSTRACT

The embodiments of the present invention disclose a back-plate structure of backlight, a backlight and a display device. The backlight is applied to a display device. The back-plate structure comprises a substrate and a plurality of optical fibers disposed on the substrate. Each optical fiber is provided with a light outlet corresponding to a sub-pixel of the display device so that light inputted into the optical fiber is emitted to the sub-pixel to which the light outlet corresponds via the light outlet.

14 Claims, 3 Drawing Sheets

BACK-PLATE STRUCTURE OF BACKLIGHT, BACKLIGHT AND DISPLAY DEVICE

TECHNICAL FIELD

Embodiments of the present invention relate to a back-plate structure of backlight, a backlight and a display device.

BACKGROUND

In general, the conventional backlights for the liquid crystal display include such types as electroluminescent (EL) backlight, cold-cathode tube backlight, and light-emitting diode (LED) backlight, etc. The EL backlight generates electromagnetic interference while emitting light and its luminance is also weak. The cold-cathode tube backlight demands high-voltage excitation, so an inverter must be provided to trigger it. Due to spatial restriction, the cold-cathode tube backlight is not suitable to be applied in a small-sized liquid crystal display device. The LED backlight usually employs a white light source containing three colors of red, green and blue, when the white light passes through sub-pixels of the liquid crystal display device, only light of one color can pass through with a large transmittance while light of the other two colors are absorbed by a color filter film. As shown in FIG. 1, each pixel of the liquid crystal display device includes sub-pixels in three colors of red, green and blue; when a white light source is adopted, only light of one color passes through the corresponding sub-pixels, that is, individual sub-pixels emits red, green or blue monochromatic light, respectively. As a result, most of the light is lost when passing through the liquid crystal display device, thereby the light utilization ratio is low.

SUMMARY

According to one embodiment of the present invention, a back-plate structure of backlight is provided. The backlight is applied to a display device. The back-plate structure comprises a substrate and a plurality of optical fibers disposed on the substrate. Each optical fiber is provided with a light outlet corresponding to a sub-pixel of the display device so that light inputted into the optical fiber is emitted to the sub-pixel to which the light outlet corresponds via the light outlet.

According to another embodiment of the present invention, a backlight is provided. The backlight is applied to a display device. The backlight comprises the back-plate structure as described above.

According to yet another embodiment of the present invention, a display device is provided. The display device comprises the backlight as described above.

DETAILED DESCRIPTION

The embodiments of the present invention will be described in detail hereinafter in conjunction with the accompanying drawings.

Figure 1:
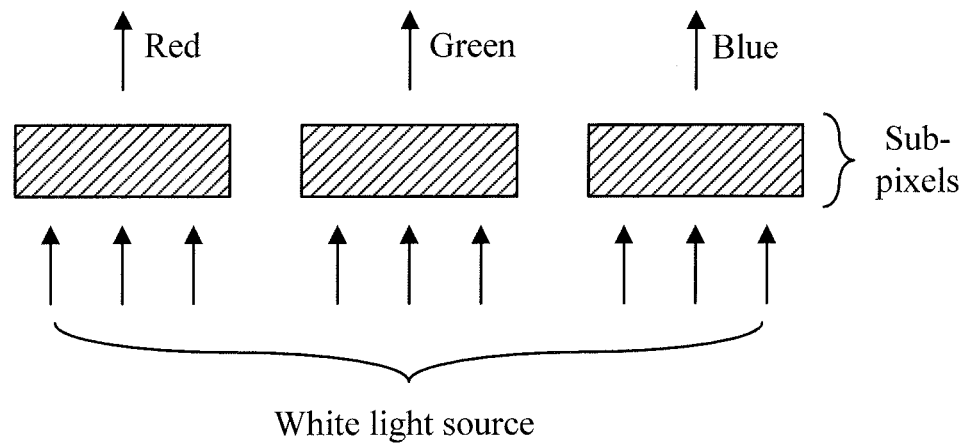
FIG. 1 is a schematic diagram showing that light of a conventional backlight passes through sub-pixels.
Figure 2:
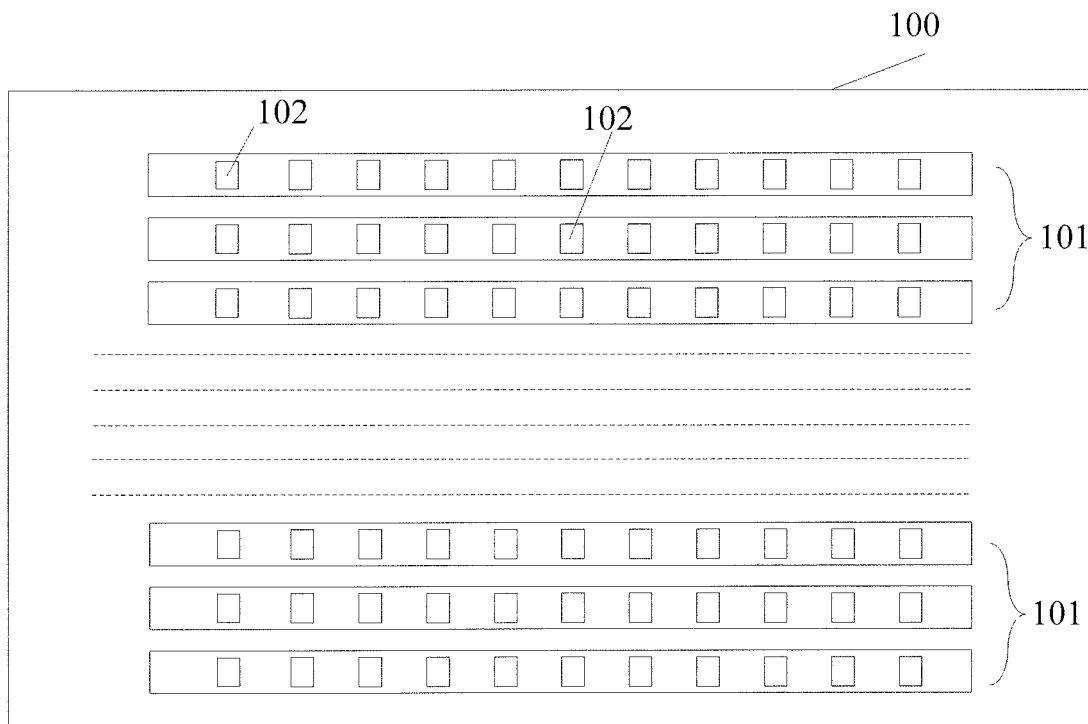
FIG. 2 is a schematic diagram of a back-plate structure of backlight according to embodiments of the present invention.

The embodiments of the present invention provide a back-plate structure of backlight. The backlight is applied to a display device which cannot emit light by itself, such as a liquid crystal display device. As shown in FIG. 2, the back-plate structure of backlight according to the embodiments of the present invention comprises: a substrate 100, and a plurality of optical fibers 101 disposed on the substrate 100. Each optical fiber 101 is provided with a light outlet 102 corresponding to a sub-pixel of the display device, so that light inputted into the optical fiber 101 is emitted to the sub-pixel to which the light outlet 102 corresponds via the light outlet 102.

Further referring to FIG. 2, the plurality of optical fibers 101 are arranged in a horizontal direction, and each optical fiber 101 is provided with a plurality of light outlets 102 to correspond to a plurality of sub-pixels. The plurality of light outlets 102 are arranged at equal intervals.

According to the embodiments of the invention, the optical fibers are provided with light outlets corresponding to the sub-pixels so that light is emitted to the sub-pixels via the light outlets of the optical fibers, thereby avoiding the problem of too large loss of light in the conventional backlight, achieving a larger light transmittance, and reducing the loss of light energy.

It should be noted that the arrangements of the optical fibers 101 and the light outlets 102 are not limited to what are shown in FIG. 2. For example, the optical fibers 101 may also be arranged in a vertical direction. Or for example, the optical fibers 101 may be arranged in a circular manner rather than in a straight line. Since light propagation in optical fibers is implemented by total reflection, light can be transmitted inside optical fibers through the channels thereof. The light outlets 102 may not necessarily be arranged at equal intervals, and they may be specifically disposed according to colors of the corresponding sub-pixels as long as the light emitted from the light outlets are in a desired color for the corresponding sub-pixels. Of course, if light transmitted in the optical fibers is white light, the light outlets may not be distinguished by color, and preferably the light outlets may be provided for all the sub-pixels to which the optical fibers correspond.

Figure 3:
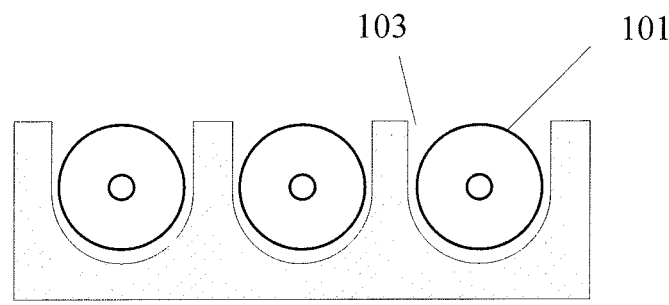
FIG. 3 is a cross-sectional schematic diagram of fixing optical fibers in grooves in the back-plate structure of backlight according to embodiments of the present invention.

FIG. 3 is a cross-sectional schematic diagram of fixing optical fibers in grooves in the back-plate structure of backlight according to the embodiments of the present invention. As shown in FIG. 3, the substrate 100 may be provided with a groove 103, in which the optical fiber 101 is fixed. FIG. 3 shows the case where one groove fixes one optical fiber, while in another embodiment one groove may fix a plurality of optical fibers 101. In addition, the number of the groove 103 may be equal to or larger than 1.

Figure 4:
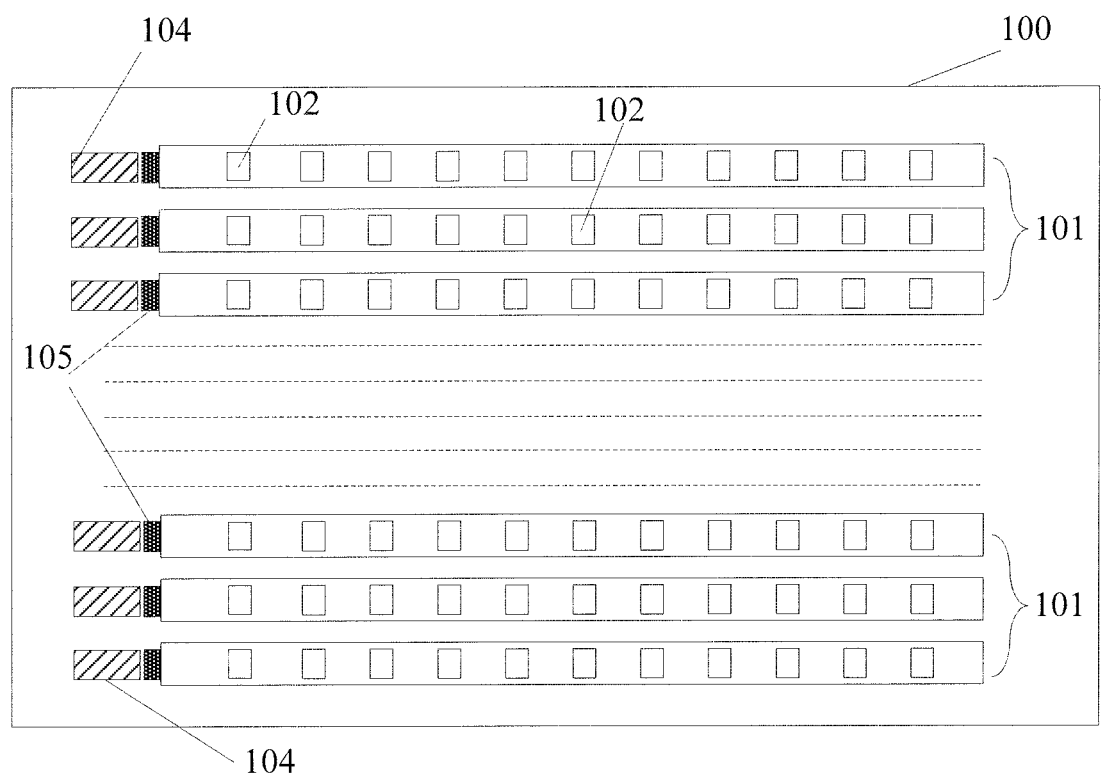
FIG. 4 is a schematic diagram of another back-plate structure of backlight according to embodiments of the present invention.

FIG. 4 is a schematic diagram of another back-plate structure of backlight according to the embodiments of the present invention. As shown in FIG. 4, in addition to the above described substrate 100, optical fibers 101 and light outlets 102, the back-plate structure further comprises a light source 104. At least one end of each of the optical fibers 101 is connected to the light source 104. The number of the light source 104 may be equal to or larger than 1.

The light source 104 may be a white light source.

The light source 104 may be a monochromatic light source. Each optical fiber 101 is connected to the monochromatic light source of one color, and the color of the light source 104 to which the optical fiber is connected is the same as the color of the sub-pixels to which the light outlet 102 of the optical fiber 101 corresponds.

In addition, the back-plate structure further comprises a coupler 105 connected between the optical fiber 101 and the light source 104. One coupler 105 may connect a pair of light source and optical fiber, or one coupler 105 may have a plurality of connecting components to connect a plurality of pairs of light source and optical fiber or to connect one light source with a plurality of optical fibers. The number of the coupler 105 may be equal to or larger than 1.

When the light source 104 is a white light source, the optical fiber 101 connected to the light source 104 may correspond to one or more lines of sub-pixels. That is to say, the optical fiber 101 connected to the light source 104 can provide light for a plurality of adjacent lines of sub-pixels, and in this case, a color filter film may be provided on the sub-pixels.

When the light source 104 is a monochromatic light source, the optical fiber connected to the light source 104 may correspond to a line of sub-pixels or a plurality of adjacent lines of sub-pixels in same color. That is to say, when the sub-pixels in adjacent lines are in different colors, each optical fiber just corresponds to one line of sub-pixels; and when a plurality of adjacent lines of sub-pixels are in the same color, the plurality of adjacent lines of sub-pixels in the same color can share one optical fiber.

It should be noted that the aforesaid "line" is not limited to the horizontal direction, and also covers the vertical direction. Further, the aforesaid "line" is not limited to either the horizontal direction or the vertical direction, and a plurality of sub-pixels can be called a line of sub-pixels as long as they can be connected to form a line.

For example, the color of the light emitted from the monochromatic light source is one of red, green and blue.

For example, the plurality of optical fibers 101 are arranged in parallel.

The embodiments of the present invention further provide a backlight. The backlight comprises the aforesaid back-plate structure.

Figure 5:
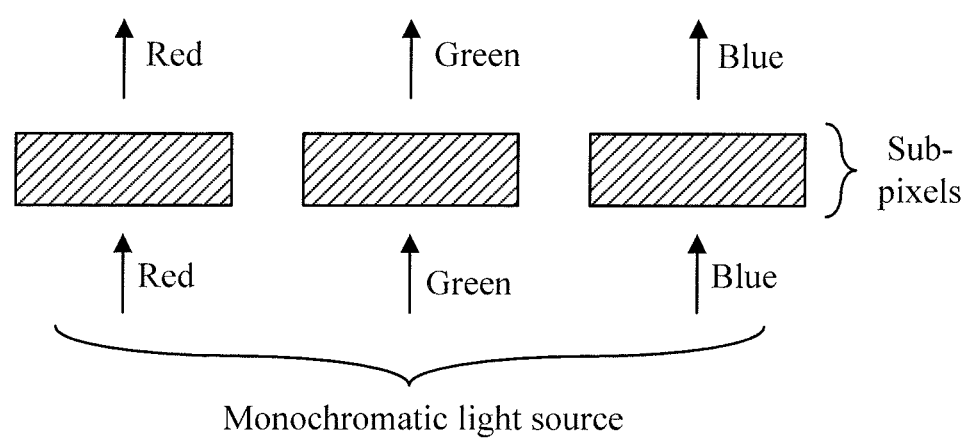
FIG. 5 is a schematic diagram showing that light of a backlight according to embodiments of the present invention passes through sub-pixels.

FIG. 5 is a schematic diagram showing that light of a backlight according to the embodiments of the present invention passes through sub-pixels. FIG. 5 illustrates the case that the sub-pixels are in three colors of red, green and blue, and red, green and blue monochromatic light sources are adopted. The three kinds of red, green and blue monochromatic light is emitted through the light outlets and correspond to red, green and blue sub-pixels, respectively. As a result, the light can pass through the corresponding sub-pixel at a maximum transmittance, and the loss of light energy can be reduced. And, in this case, color filter films corresponding to respective sub-pixels may not be provided.

For example, the monochromatic light source is a LED light source. The LED light source has good light uniformity and long lifetime, and does not require a converter, thereby further reducing thickness of the backlight.

For example, the optical fiber is a glass light-guiding optical fiber.

For example, if one optical fiber corresponds to one line of sub-pixels, the diameter of the optical fiber is less than or equal to the width of the line of sub-pixels. If the diameter of the optical fiber is too large, it shall cause interference of the emitted light and waste of energy. If the diameter of the optical fiber is too small, it shall not provide sufficient light for the sub-pixels. Based on the above considerations, the diameter of the optical fiber may be, for example, within 0.2~0.6 mm.

The light outlet on the optical fiber may be in any suitable geometrical shape.

The embodiments of the present invention further provide a display device. The display device comprises the aforesaid backlight.

The foregoing embodiments merely are exemplary embodiments of the invention, and not intended to define the scope of the invention, and the scope of the invention is determined by the appended claims.

What is claimed is:

1. A back-plate structure of backlight, the backlight being applied to a display device, wherein
    the back-plate structure comprises a substrate and a plurality of optical fibers disposed on the substrate,
    each optical fiber corresponding to a line of sub-pixels or a plurality of adjacent lines of sub-pixels,
    each optical fiber is provided with a plurality of light outlets corresponding to a plurality of sub-pixels of the display device so that light inputted into the optical fiber is emitted to the plurality of sub-pixels to which the plurality of light outlets correspond via the plurality of light outlets.

2. The back-plate structure according to claim 1, wherein a plurality of grooves are disposed on the substrate, and each groove is used to fix one or more of the plurality of optical fibers.

3. The back-plate structure according to claim 1, wherein the back-plate structure further comprises a light source, and at least one end of each optical fiber is connected to the light source.

4. The back-plate structure according to claim 3, wherein the back-plate structure further comprises a coupler, and the coupler is used to connect a pair of optical fiber and light source, or to connect a plurality of pairs of light sources and optical fibers or to connect one light source with several optical fibers.

5. The back-plate structure according to claim 3, wherein the light source is a white light source, and the optical fiber connected to the light source corresponds to a line of sub-pixels or a plurality of adjacent lines of sub-pixels.

6. The back-plate structure according to claim 3, wherein the light source is a monochromatic light source;
    each optical fiber is connected to the monochromatic light source of one color, and a color of the light source to which the optical fiber is connected is the same as a color of the sub-pixel to which the light outlet on the optical fiber corresponds;
    the optical fiber connected to the light source corresponds to a line of sub-pixels or a plurality of adjacent lines of sub-pixels in the same color.

7. The back-plate structure according to claim 6, wherein a color of the monochromatic light source is one of red, green and blue.

8. The back-plate structure according to claim 3, wherein the light source is a light-emitting diode (LED).

9. The back-plate structure according to claim 1, wherein the optical fiber is a glass light-guiding optical fiber.

10. The back-plate structure according to claim 1, wherein a diameter of the optical fiber is less than or equal to a width of the corresponding sub-pixel.

11. The back-plate structure according to claim 1, wherein the light outlet on the optical fiber is in any suitable geometrical shape.

12. The back-plate structure according to claim 1, wherein the plurality of optical fibers are arranged in parallel.

13. A backlight, wherein the backlight comprises the back-plate structure according to claim 1.

14. A display device, wherein the display device comprises the backlight according to claim 13.

\* \* \* \* \*